(12) United States Patent
Monastiriotis et al.

(10) Patent No.: US 9,725,645 B2
(45) Date of Patent: Aug. 8, 2017

(54) PROPPANT WITH COMPOSITE COATING

(71) Applicant: Preferred Technology, LLC, Radnor, PA (US)

(72) Inventors: Spyridon Monastiriotis, Dallas, TX (US); Avis Lloyd McCrary, Montgomery, TX (US); Robert Ray McDaniel, Cypress, TX (US); Ralph Edward Barthel, Wake Forest, NC (US)

(73) Assignee: Preferred Technology, LLC, Radnor, PA (US)

( * ) Notice: Subject to any disclaimer, the term of this patent is extended or adjusted under 35 U.S.C. 154(b) by 82 days.

(21) Appl. No.: 14/015,629

(22) Filed: Aug. 30, 2013

(65) Prior Publication Data

US 2014/0162911 A1   Jun. 12, 2014

Related U.S. Application Data

(63) Continuation-in-part of application No. 13/626,055, filed on Sep. 25, 2012, now Pat. No. 9,290,690, which is a continuation-in-part of application No. 13/224,726, filed on Sep. 2, 2011, which is a continuation-in-part of application No. 13/188,530, filed on Jul. 22, 2011, now Pat. No. 9,040,467, which is a continuation-in-part of application No. 13/099,893, filed on May 3, 2011, now Pat. No. 8,993,489.

(51) Int. Cl.
  C09K 8/60        (2006.01)
  C09K 8/588       (2006.01)
  C09K 8/524       (2006.01)
  C09K 8/80        (2006.01)

(52) U.S. Cl.
  CPC .................... C09K 8/805 (2013.01)

(58) Field of Classification Search
  CPC ...................................... C09K 8/805
  USPC ........................................ 507/221
  See application file for complete search history.

(56) References Cited

U.S. PATENT DOCUMENTS

| | | |
|---|---|---|
| 2,163,972 A | 6/1939 | Anderson |
| 2,366,007 A | 12/1944 | D'Alelio |
| 2,653,089 A | 9/1953 | Bulson |
| 2,823,753 A | 2/1958 | Henderson |
| 3,026,938 A | 9/1958 | Huitt |
| 3,020,250 A | 2/1962 | Norwalk |
| 3,392,148 A | 7/1968 | Hunter |
| 3,763,072 A | 10/1973 | Krieger |
| 3,805,531 A | 4/1974 | Kistner |
| 3,817,939 A | 6/1974 | Allen et al. |
| 3,837,892 A | 9/1974 | Marzocchi |
| 3,900,611 A | 8/1975 | Corbett et al. |
| 3,929,191 A | 12/1975 | Graham |
| 3,931,428 A | 1/1976 | Reick |
| 3,971,751 A | 7/1976 | Isayama et al. |
| 3,976,135 A | 8/1976 | Anderson |
| 3,991,225 A | 11/1976 | Blouin |
| 4,074,760 A | 2/1978 | Copeland |
| 4,113,014 A | 9/1978 | Kubens |
| 4,177,228 A | 12/1979 | Prolss |
| 4,199,484 A | 4/1980 | Murphey |
| 4,252,655 A | 2/1981 | Carney |
| 4,273,910 A | 6/1981 | Lederer |
| 4,417,992 A | 11/1983 | Bhattacharyya et al. |
| 4,443,347 A | 4/1984 | Underdown |
| 4,465,815 A | 8/1984 | Chattha |
| 4,493,875 A | 1/1985 | Beck |
| 4,518,039 A | 5/1985 | Graham |
| 4,554,188 A | 11/1985 | Holubka et al. |
| 4,585,064 A | 4/1986 | Graham |
| 4,592,931 A | 6/1986 | Cargle |
| 4,594,268 A | 6/1986 | Kirwin |
| 4,732,920 A | 3/1988 | Graham et al. |
| 4,746,543 A | 5/1988 | Zinkan et al. |
| 4,785,884 A | 11/1988 | Armbruster |
| 4,792,262 A | 12/1988 | Kapps et al. |
| 4,801,635 A | 1/1989 | Zinkan et al. |
| 4,822,425 A | 4/1989 | Burch |

(Continued)

FOREIGN PATENT DOCUMENTS

| | | |
|---|---|---|
| EP | 0207668 A1 | 1/1987 |
| EP | 2469020 A1 | 6/2012 |

(Continued)

OTHER PUBLICATIONS

The removal of heavy metal cations by natural zeolites, http://www.resultsrna.com/research/zeolite_binds_heavy_metals.php, pp. 3-7.
Wingenfelder, Ulla et al., Removal of Heavy Metals from Mine Waters by Natural Zeolites, Environ. Sci. Technol., 2005, vol. 39, 4606-4613.
Halimoon, Normala, Removal of Heavy Metals from Textile Wastewater Using Zeolite, EnvironmentAsia 3(special issue) 2010, 124-130.
Wikipedia, Methylene diphenyl diisocyanate, http://en.wikipedia.org/wiki/Methylene_diphenyl_diisocyanate.
CARBO Ceramics, Topical Reference, Physical Properties of Proppants, pp. 1-5.
Huntsman, Performance products JEFFCAT catalysts for the Polyurethane Industry—Asia-Pacific, pp. 1-6.

(Continued)

Primary Examiner — Aiqun Li
(74) Attorney, Agent, or Firm — Pepper Hamilton LLP

(57) ABSTRACT

Proppants for hydraulic fracturing of oil and gas wells have a polymeric coating that is strengthened with reinforcing particulates that are reactive with, or chemically bonded to, the polymeric proppant coating. Preferably, these particulates are added into the coating during the coating process. In one embodiment, functionalized particulates are used that become grafted into the polymer of the proppant coating through the chemical functionality imparted to the particulates. If non-functionalized particulates are used, a coupling agent is preferably added to enhance the bond strength between the added particulates and the polymeric matrix of the proppant coating.

21 Claims, No Drawings

(56) References Cited

U.S. PATENT DOCUMENTS

| | | |
|---|---|---|
| 4,920,192 A | 4/1990 | Wiser-Halladay |
| 5,048,608 A | 9/1991 | Wiser-Halladay |
| 5,092,404 A | 3/1992 | Falk et al. |
| 5,138,055 A | 8/1992 | Parekh |
| 5,181,957 A | 1/1993 | Gross et al. |
| 5,188,175 A | 2/1993 | Sweet |
| 5,194,174 A | 3/1993 | Roe et al. |
| 5,199,491 A | 4/1993 | Kutta |
| 5,218,038 A | 6/1993 | Johnson et al. |
| 5,242,248 A | 9/1993 | Bramwell |
| 5,256,729 A | 10/1993 | Kutta |
| 5,264,572 A | 11/1993 | Endo et al. |
| 5,330,836 A | 7/1994 | Buese |
| 5,420,174 A | 5/1995 | Dewprashad |
| 5,422,183 A | 6/1995 | Sinclair |
| 5,480,584 A | 1/1996 | Urano et al. |
| 5,582,249 A | 12/1996 | Caveny |
| 5,597,784 A | 1/1997 | Sinclair |
| 5,721,315 A | 2/1998 | Evans |
| 5,728,302 A | 3/1998 | Connor et al. |
| 5,733,952 A | 3/1998 | Geoffrey |
| 5,824,462 A | 10/1998 | Ashida et al. |
| 5,837,656 A | 11/1998 | Sinclair et al. |
| 5,849,818 A | 12/1998 | Walles et al. |
| 5,856,271 A | 1/1999 | Cataldo et al. |
| 5,911,876 A | 6/1999 | Rose |
| 5,924,488 A | 7/1999 | Nguyen |
| 5,955,144 A | 9/1999 | Sinclair et al. |
| 6,071,990 A | 6/2000 | Yip et al. |
| 6,079,492 A | 6/2000 | Hoogteijling |
| 6,093,469 A | 7/2000 | Callas |
| 6,093,496 A | 7/2000 | Dominguez et al. |
| 6,114,410 A | 9/2000 | Betzold |
| 6,127,308 A | 10/2000 | Slack et al. |
| 6,187,892 B1 | 2/2001 | Markusch et al. |
| 6,207,766 B1 | 3/2001 | Doi et al. |
| 6,270,692 B1 | 8/2001 | Geissler et al. |
| 6,306,964 B1 | 10/2001 | Evans |
| 6,372,842 B1 | 4/2002 | Grisso et al. |
| 6,387,501 B1 | 5/2002 | McCrary |
| 6,406,789 B1 | 6/2002 | McDaniel |
| 6,486,287 B2 | 11/2002 | McGall |
| 6,528,157 B1 | 3/2003 | Hussain |
| 6,582,819 B2 | 6/2003 | McDaniel |
| 6,632,527 B1 | 10/2003 | McDaniel |
| 6,668,926 B2 | 12/2003 | Nguyen |
| 6,705,400 B1 | 3/2004 | Nguyen |
| 6,732,800 B2 | 5/2004 | Acock et al. |
| 6,767,978 B2 | 7/2004 | Aubart et al. |
| 6,790,245 B2 | 9/2004 | Wolff et al. |
| 6,809,149 B2 | 10/2004 | Meyer |
| 6,866,099 B2 | 3/2005 | Nguyen |
| 7,012,043 B2 | 3/2006 | Klein |
| 7,074,257 B2 | 7/2006 | Lockwood et al. |
| 7,078,442 B2 | 7/2006 | Brown |
| 7,129,308 B2 | 10/2006 | McGall |
| 7,135,231 B1 | 11/2006 | Sinclair |
| 7,153,575 B2 | 12/2006 | Anderson |
| 7,157,021 B2 | 1/2007 | Bytnar et al. |
| 7,216,711 B2 | 5/2007 | Nguyen |
| 7,244,492 B2 | 7/2007 | Sinclair |
| 7,261,156 B2 | 8/2007 | Nguyen |
| 7,270,879 B2 | 9/2007 | McCrary |
| 7,281,581 B2 | 10/2007 | Nguyen |
| 7,318,472 B2 | 1/2008 | Smith |
| 7,318,474 B2 | 1/2008 | Welton |
| 7,322,411 B2 | 1/2008 | Brannon |
| 7,326,346 B2 | 2/2008 | Lovell et al. |
| 7,332,089 B2 | 2/2008 | Harjula et al. |
| 7,334,635 B2 | 2/2008 | Nguyen |
| 7,334,783 B2 | 2/2008 | Yoneyama et al. |
| 7,343,973 B2 | 3/2008 | Dusterhoft |
| 7,344,783 B2 | 3/2008 | Shea |
| 7,350,571 B2 | 4/2008 | Nguyen |
| 7,407,010 B2 | 8/2008 | Rickman |
| 7,528,096 B2 | 5/2009 | Brannon |
| 7,537,702 B2 | 5/2009 | Lupton et al. |
| 7,624,802 B2 | 12/2009 | McCrary |
| 7,678,872 B2 | 3/2010 | Glass et al. |
| 7,721,804 B2 | 5/2010 | Duenckel |
| 7,726,399 B2 | 6/2010 | Brannon |
| 7,754,659 B2 | 7/2010 | Rediger |
| 7,772,163 B1 | 8/2010 | Brannon |
| 7,789,147 B2 | 9/2010 | Brannon |
| 7,803,742 B2 | 9/2010 | Bicerano |
| 7,884,043 B2 | 2/2011 | Lisetskiy et al. |
| 7,896,080 B1 | 3/2011 | Watters et al. |
| 7,919,183 B2 | 4/2011 | McDaniel |
| 7,921,910 B2 | 4/2011 | Wilson et al. |
| 7,999,013 B2 | 8/2011 | Brown |
| 8,006,754 B2 | 8/2011 | Bicerano |
| 8,006,755 B2 | 8/2011 | Bicerano |
| 8,052,890 B2 | 11/2011 | Nguyen |
| 8,133,587 B2 | 3/2012 | Rediger |
| 8,183,179 B2 | 5/2012 | Garcia-Lopez De Victoria et al. |
| 8,258,206 B2 | 9/2012 | Kanagasabapathy et al. |
| 8,298,667 B2 | 10/2012 | Smith |
| 8,338,351 B2 | 12/2012 | Kanagasabapathy et al. |
| 8,349,911 B2 | 1/2013 | Kuehnle |
| 8,354,279 B2 | 1/2013 | Nguyen et al. |
| 8,360,149 B2 | 1/2013 | Hughes |
| 8,431,220 B2 | 4/2013 | Wu et al. |
| 8,513,342 B2 | 8/2013 | Gao et al. |
| 8,763,700 B2 | 7/2014 | McDaniel et al. |
| 8,936,083 B2 | 1/2015 | Nguyen |
| 9,040,467 B2 | 5/2015 | McDaniel et al. |
| 2001/0014453 A1 | 8/2001 | McGall et al. |
| 2002/0048676 A1 | 4/2002 | McDaniel |
| 2003/0102128 A1 | 6/2003 | Dawson et al. |
| 2003/0131998 A1 | 7/2003 | Nguyen |
| 2003/0196805 A1 | 10/2003 | Boney |
| 2003/0224165 A1 | 12/2003 | Anderson |
| 2004/0010267 A1 | 1/2004 | Nakamura et al. |
| 2004/0129923 A1 | 7/2004 | Nguyen et al. |
| 2004/0138343 A1 | 7/2004 | Campbell |
| 2005/0018193 A1 | 1/2005 | Chilese et al. |
| 2005/0019574 A1 | 1/2005 | McCrary |
| 2005/0173116 A1 | 8/2005 | Nguyen et al. |
| 2005/0274523 A1 | 12/2005 | Brannon et al. |
| 2006/0035790 A1 | 2/2006 | Okell et al. |
| 2006/0073980 A1 | 4/2006 | Brannon et al. |
| 2006/0157243 A1 | 7/2006 | Nguyen |
| 2006/0241198 A1 | 10/2006 | Motz et al. |
| 2007/0021309 A1 | 1/2007 | Bicerano |
| 2007/0034373 A1 | 2/2007 | McDaniel |
| 2007/0036977 A1 | 2/2007 | Sinclair et al. |
| 2007/0066742 A1* | 3/2007 | Mhetar .............. C08L 25/06 524/433 |
| 2007/0073590 A1 | 3/2007 | Cosentino et al. |
| 2007/0088137 A1 | 4/2007 | Georgeau et al. |
| 2007/0161515 A1 | 7/2007 | Bicerano |
| 2007/0204992 A1 | 9/2007 | Davis |
| 2007/0208156 A1 | 9/2007 | Posey |
| 2007/0209794 A1 | 9/2007 | Kaufman |
| 2007/0215354 A1 | 9/2007 | Rickman |
| 2007/0228322 A1 | 10/2007 | Chaves et al. |
| 2007/0289781 A1 | 12/2007 | Rickman et al. |
| 2008/0011478 A1 | 1/2008 | Welton et al. |
| 2008/0063868 A1 | 3/2008 | Chung |
| 2008/0087429 A1 | 4/2008 | Brannon et al. |
| 2008/0202744 A1 | 8/2008 | Crews |
| 2008/0202750 A1 | 8/2008 | Rediger |
| 2008/0230223 A1 | 9/2008 | McCrary |
| 2008/0236825 A1 | 10/2008 | Barmatov et al. |
| 2009/0044942 A1 | 2/2009 | Gupta |
| 2009/0176667 A1 | 7/2009 | Nguyen |
| 2009/0238988 A1 | 9/2009 | McDaniel |
| 2010/0065271 A1 | 3/2010 | McCrary |
| 2010/0147507 A1 | 6/2010 | Korte et al. |
| 2010/0196621 A1 | 8/2010 | Larson-Smith et al. |
| 2010/0212898 A1 | 8/2010 | Nguyen et al. |
| 2010/0282462 A1 | 11/2010 | Xu et al. |
| 2010/0286000 A1 | 11/2010 | Huang |
| 2011/0016837 A1 | 1/2011 | Fischer et al. |

(56) References Cited

U.S. PATENT DOCUMENTS

| | | |
|---|---|---|
| 2011/0024129 A1 | 2/2011 | Turakhia et al. |
| 2011/0053809 A1 | 3/2011 | Sanders et al. |
| 2011/0120719 A1 | 5/2011 | Soane et al. |
| 2011/0160097 A1 | 6/2011 | Mirzaei et al. |
| 2011/0162837 A1 | 7/2011 | O'Malley |
| 2011/0244125 A1 | 10/2011 | Weisenberg |
| 2011/0272146 A1 | 11/2011 | Green |
| 2011/0297383 A1 | 12/2011 | Tanguay |
| 2012/0018162 A1 | 1/2012 | Tanguay |
| 2012/0277130 A1 | 11/2012 | Usova |
| 2012/0279703 A1 | 11/2012 | McDaniel et al. |
| 2012/0283153 A1 | 11/2012 | McDaniel et al. |
| 2012/0322925 A1 | 12/2012 | Arigo |
| 2013/0005856 A1 | 1/2013 | Phonthammachai |
| 2013/0037048 A1 | 2/2013 | Edgington et al. |
| 2013/0045901 A1 | 2/2013 | Bicerano |
| 2013/0048365 A1 | 2/2013 | Kim et al. |
| 2013/0065800 A1 | 3/2013 | McDaniel et al. |
| 2013/0081812 A1 | 4/2013 | Green et al. |
| 2013/0164449 A1 | 6/2013 | Tadepalli et al. |
| 2013/0184381 A1 | 7/2013 | Bilodeau et al. |
| 2013/0186624 A1 | 7/2013 | McCrary et al. |
| 2013/0203917 A1 | 8/2013 | Harris et al. |
| 2013/0233545 A1 | 9/2013 | Mahoney et al. |
| 2013/0312974 A1 | 11/2013 | McClung, IV |
| 2014/0060826 A1 | 3/2014 | Nguyen |
| 2014/0162911 A1 | 6/2014 | Monastiriotis |
| 2014/0262247 A1 | 9/2014 | Duenckel et al. |
| 2014/0274819 A1 | 9/2014 | McCrary et al. |
| 2014/0305650 A1 | 10/2014 | Song et al. |
| 2014/0338906 A1 | 11/2014 | Monastiriotis et al. |
| 2015/0034314 A1 | 2/2015 | Hudson et al. |
| 2015/0119301 A1 | 4/2015 | McDaniel et al. |

FOREIGN PATENT DOCUMENTS

| | | |
|---|---|---|
| GB | 1294017 A | 10/1972 |
| WO | 2005121272 A1 | 12/2005 |
| WO | 2010/049467 | 5/2010 |
| WO | 2013048365 A1 | 4/2013 |
| WO | 2013112251 A1 | 8/2013 |
| WO | 2013158306 A1 | 10/2013 |
| WO | 2014144464 A2 | 9/2014 |

OTHER PUBLICATIONS

Huntsman, JEFFCAT Amine Catalysts for the Polyurethane Industry—Americas Region.
Sanchez, Mariano, FRAC Packing: Fracturing for Sand Control, Middle East and Asia Reservoir Review, Nov. 8, 2007, pp. 37-49.
Interstate Oil and Gas Compact Commission and All Consulting, A Guide to Practical Management of Produced Water from Onshore Oil and Gas Operations in the United States, Oct. 2006.
Boster, Ronald S., A Study of Ground-Water Contamination Due to Oil-Field Brines in Morrow and Delaware Counties, Ohio, With Emphasis on Detection Utilizing Electrical Resistivity Techniques, The Ohio State University, 1967.
EPA, Oil and Gas Extraction, Compliance and Enforcement History, Sector Notebook Project, Oct. 2000, pp. 115-155.
Huntsman, The JEFFAMINE Polyetheramines, 2007.
Hui et al., Removal of mixed heavy metal ions in wastewater by zeolite 4A and residual products from recycled coal fly ash, Journal of Hazardous Materials, Aug. 1, 2005, vol. B127, pp. 89-101.
AkzoNobel Tomorrow's Answers Today, Declaration of Compliance Bindzil CC401, Eka Chemical, Jan. 27, 2010, pp. 1-4.
AkzoNobel Tomorrow's Answers Today, Silane Modified Colloidal Silica Bindzil CC in Waterborne Coating Applications Use and Benefits, 2011, pp. 1-6.
Final Office Action dated Apr. 29, 2016 in U.S. Appl. No. 14/798,774.
Final Office Action dated May 3, 2016 in U.S. Appl. No. 14/266,179.
Final Office Action dated May 27, 2016 in U.S. Appl. No. 13/837,396.
Notice of Allowance dated Aug. 8, 2016 in U.S. Appl. No. 13/837,396.
Non-Final Office Action dated Mar. 18, 2016 in U.S. Appl. No. 13/355,969.
Non-Final Office Action dated Apr. 5, 2016 in U.S. Appl. No. 14/314,573.
Non-Final Office Action dated Apr. 5, 2016 in U.S. Appl. No. 13/897,288.
Chemicalland21, "Lauryl alcohol ethoxylates" Mar. 18, 2006, https://web.archive.org/web/20060318023334/http://www.chemicalland21.com/specialtychem/perchem/LAURYLY%20ALCOHOL%20ETHOXYLATE.htm.
Non-Final Office Action dated Aug. 25, 2016 in U.S. Appl. No. 15/073,840.
Ramirez et al., Synthesis of crosslinked and functionalized polystyrene by miniemulsion polymerization: particle size control, Macromex 2014.
Sigma-Aldrich, "Polybutadiene, hydroxyl terminated" Jun. 8, 2014, https://web.archive.org/web/20140608155646/http:product/aldrich/190799?lang=en&region=).
International Search Report and Written Opinion issued in PCT/US2012/036093 dated Aug. 14, 2012.
International Search Report and Written Opinion issued in PCT/US2012/047519 dated Nov. 2, 2012.
International Search Report and Written Opinion issued in PCT/US2012/053277 dated Nov. 20, 2012.
International Search Report issued in PCT/US2012/070844 dated Mar. 8, 2013.
Official Action datd Nov. 30, 2015 from U.S. Appl. No. 14/798,774.
Polyurethanes, Ullmann's Encyclopedia of Industrial Chemistry, 2012, vol. 29.
Wikipedia, ion-exchange resin, en.wikipedia.org/wikillon_exchange_resins, pp. 1-5.
Wikipedia, Piezoelectricity, en.wikipedia.org.wiki/Piezoelectricity, pp. 1-15.
Cao et al., Mesoporous $SiO_2$-supported Pt Nanoparticles for catalytic application, ISRN Nanomaterials, 2013, Article ID 745397, 7 pages.
Kuang et al., Controllable fabrication of $SnO_2$-coated multiwalled carbon nanotubes by chemical vapor deposition, Carbon 2006 44(7):1166-1172.
Madaan and Tyagi, Quaternary pryidinium salts: a review, J Oleo Sci 2008 57(4):197-215.
Mellaerts et al., Enhanced release of itraconazole from ordered mesoporous SBA-15 silica materials, Chem Commun 2007 7(13):1375-7.
Notice of Allowance dated Dec. 22, 2015 in U.S. Appl. No. 13/626,055.

* cited by examiner

PROPPANT WITH COMPOSITE COATING

CROSS-REFERENCE TO RELATED APPLICATIONS

This application is a continuation-in-part of copending application Ser. No. 13/626,055, filed on Sep. 25, 2012; which is a continuation-in-part of application Ser. No. 13/188,530 filed on Jul. 22, 2011; which is a continuation-in-part of application Ser. No. 13/099,893, filed on May 3, 2011. This application is also a continuation-in-part of copending application Ser. No. 13/224,726, filed on Sep. 2, 2011. The disclosure of each of these applications is hereby incorporated by reference.

FIELD OF INVENTION

The invention relates to a composition and method for the production of proppants having a coating that exhibits enhanced conductivity under medium and high pressure, downhole, fractured strata conditions.

BACKGROUND OF THE INVENTION

Coated proppants are often used in hydraulic well fracturing to increase production rate of the well. The commercial "standard" coatings are typically a form of phenolic thermoset coating. For high temperature wells, such as those with a bottom hole temperature above about 200° F. (93° C.), precured phenolic coatings are often used due to their high load-bearing properties. The high crack closure stresses are usually above 6,000 psi, and often above 10,000 psi, so the proppant must resist such forces in order to keep the fracture cracks open and maintain fracture conductivity.

In practice, however, a variety of factors can adversely affect the performance of phenolic proppant coatings. The most important of these is premature curing of the partially cured phenolic resin in the coating due to exposure to high temperatures before the fractured strata has closed to the point that it forces particle to particle contact. Even the elevated, above-ground, temperatures found on loading docks and in shipping containers can be enough to effect curing of the coating long before it is desirable.

Recently, it has been discovered that cured, commercially acceptable, coatings can be applied to proppants using the polyurethane or polyurea reaction products of polyols and isocyanates. The details of these processes are disclosed in co-pending US patent application Ser. No. 13/099,893 (entitled "Coated and Cured Proppants"); Ser. No. 13/188,530 (entitled "Coated and Cured Proppants"); Ser. No. 13/626,055 (entitled "Coated and Cured Proppants"); Ser. No. 13/224,726 (entitled "Dual Function Proppants"); Ser. No. 13/355,969 (entitled "Manufacture of Polymer Coated Proppants"); and Ser. No. 13/837,396 (entitled "Proppant With Polyurea-Type Coating"), the disclosures of which are herein incorporated by reference. Such polyurethane and polyurea-based proppant coatings are economically and environmentally desirable for a number of reasons. Importantly, each acts like a fully cured coating for purposes of handling, shipping and introduction into a fractured field yet exhibit the inherent ability to form interparticle bonds under downhole temperatures and pressures for enhanced conductivity and to minimize proppant flowback after the well is put into production. Commercially available proppants that use such coatings are available under the designations PEARL and GARNET from Preferred Sands, Inc. of Radnor, Pa.

See also Tanguay et al. 2011/0297383 for high temperature proppant coatings made of a polycarbodiimide coating on sand and Tanguay et al. 2012/0018162 which relates to a polyamide imide proppant coating for high temperature applications.

Despite the potential benefits of interparticle bonding seen in the polyurethane and polyurea proppant coatings, there exists a continuing need in the industry for a proppant coating that exhibits a higher crush strength and resistance to crack closure stresses of 10,000 psi or more. The deformation of proppant coatings under the very high crack closure stresses that are found in high temperature/high pressure wells can be sufficient to alter pore passages and reduce the conductivity of the fractured strata.

It would also be even more desirable if proppants suitable for high temperature/high pressure strata would also exhibit some level of interparticle bond strength without the use or introduction of bond formation or polymer softening agents into the fractured strata. Such interparticle bonding would provide a further effect for retaining the coated proppants within the fractured strata despite the outflow of fluids and gases that can dislodge the proppant particulates and flush them from the strata.

Others have considered the addition of various materials into the coating on a proppant core to address one or more issues. For example, U.S. Pat. No. 4,493,875 relates to a composite proppant with a sand core and hollow, glass microspheres in an "adhesive" that bonds the microspheres to the core. A resole phenol/formaldehyde resin is used in the examples as a coating on the sand core of the proppant.

U.S. Pat. Nos. 5,422,183 and 5,597,784 teaches a proppant having a substantially cured inner resin coating, an outer resin coating, and a reinforcing agent interspersed at the inner coating/outer coating boundary, which is used in the propping of a fracture in a subterranean formation. The core of the proppant is said to be glass beads; various organic materials such as walnut shells, pecan shells, and synthetic polymers; or metallic particulates such as steel or aluminum pellets.

U.S. Pat. No. 6,406,789 describes a proppant particle made with a resin and filler material. The disclosed resins include epoxy, phenolic, a combination of a phenolic novolac polymer and a phenolic resole polymer; a cured combination of phenolic/furan resin or a furan resin to form a precured resin; or a curable furan/phenolic resin system curable in the presence of a strong acid to form a curable resin. The finely divided minerals that can be included in the resin include silica (quartz sand), alumina, mica, metasilicate, calcium silicate, calcine, kaolin, talc, zirconia, boron and glass. Microcrystalline silica is noted as especially preferred.

U.S. Pat. No. 6,528,157 discloses a resin-coated proppant that contains fibers where at least a portion of the fibers protrude from the resin coating to interlock with fibers of other proppant particulates.

U.S. Pat. No. 7,490,667 describes a proppant having a water-soluble external coating on the proppant particle substrate and a microparticulate reinforcing and spacing agent at least partially embedded in the water-soluble external coating in a manner such that the microparticulate reinforcing agent is substantially released from the proppant particle substrate when the water-soluble coating dissolves or degrades.

U.S. Pat. No. 7,803,742 pertains to thermoset nanocomposite particulates made with carbon black, fumed silica, fumed alumina, carbon nanotubes, carbon nanofibers, cellulosic nanofibers, fly ash, polyhedral oligomeric silsesquioxanes, or mixtures thereof.

U.S. Pat. Nos. 8,006,754 and 8,006,755 describe proppants coated by a material whose electromagnetic properties change at a detectable level under a mechanical stress such as the closure stress of a fracture. A preferred proppant is described as a thermoset nanocomposite particulate substrate where the matrix material comprises a terpolymer of styrene, ethylvinylbenzene and divinylbenzene, and carbon black particulates possessing a length that is less than 0.5 microns in at least one principal axis direction incorporated as a nanofiller. Over the proppant is a coating that comprises a PZT alloy manifesting a strong piezoelectric effect or Terfenol-D manifesting giant magnetostrictive behavior to provide the ability to track in a downhole environment.

U.S. Pat. No. 8,298,667 describes the use of two ceramic layers that can contain a reinforcing agent of carbon black, fiberglass, carbon fibers, ceramic whiskers, ceramic particulates, metallic particulates, or any combination thereof.

Published US Patent Application 2012/0277130 describes a proppant made from a ceramic matrix with inorganic reinforcing fibers such as wollastonite, wollastonite concentrate, synthetic wollastonite, beta-wollastonite, enstatite, dolomite, magnesia, magnesium silicates, forsterite, steatite, olivines, silicon carbide, silicon nitride, inorganic fibers, fibers produced from slugs, commercially available inorganic crystalline fibers, alpha-alumina based fibers, alumina-silica based fibers, glass fibers.

Published US Patent Application 2013/0045901 describes the addition of nanoscale carbon black, fumed silica, fumed alumina, carbon nanotubes, carbon nanofibers, cellulosic nanofibers, natural and synthetic nanoclays, finely divided grades of fly ash, the polyhedral oligomeric silsesquioxanes, and clusters of different types of metals, metal alloys, and metal oxides for nanocomposite proppants.

Despite the advances in the field of proppant technology, there remains a need in the industry for premium proppants for medium and high pressure fields that can resist deformation under the very high crack closure stresses that are found in high temperature/high pressure wells.

SUMMARY OF THE INVENTION

It is an object of the invention to provide a proppant exhibiting an enhanced level of hardness and crush resistance that is suited for fractured fields exhibiting medium and high crack closure stress levels.

In accordance with the above and other objects of the invention that will become apparent from the description herein, the present invention provides a proppant having a polymeric coating that is strengthened with reinforcing particulates that are grafted to or bonded to the polymeric proppant coating. Preferably, these particulates are added into and become part of the coating during the coating process. In one embodiment, functionalized particulates are used that become grafted into the polymer of the proppant coating through the chemical functionality imparted to the particulates. If non-functionalized particulates are used, a coupling agent is preferably added to enhance the bond strength between the added particulates and the polymeric matrix of the proppant coating.

The hard particulates that are integrated into the proppant coating are preferably chemically integrated and chosen to impart a greater hardness and/or deformation resistance to the coating. An increased hardness reduces agglomeration during storage and shipping and helps to mitigate dust. Reduced deformation of the proppant coating avoids pore closure due to coating deformation with the effect of maintained conductivity, even in high pressure wells. When functionalized particulates are used or if an adhesion promoter is used with non-functionalized particulates, the added chemical bonding helps the particle to remain in the coating and avoid the formation of microcrack defect sites that could be initiation sites for cracks leading to dusting and deterioration.

DETAILED DESCRIPTION OF THE INVENTION

The present invention relates to a coated proppant that includes particulates that are firmly bound to or grafted to the polymeric coating. These particulates impart enhanced hardness to the proppant coating and an internal reinforcing agent linked to the polymeric matrix of the coating that resists deformation of the composite coating under medium and high pressure stress.

The particulates added to the proppant coating in the present invention can be organic or inorganic. Preferred particulates for use in the present composite proppant coating are selected from among a wide variety of materials whose presence in the coating will enhance the overall strength and deformation resistance of the coated proppant. Reinforcing particulates can be used in any layer or layers applied to the proppant core solid.

Organic particulates that are useful for the present invention include particulates that are relatively harder than the proppant matrix polymer and may be pre-reacted to include reactive functionalities for bonding with the polymeric matrix of the proppant coating or they may be non-reactive if a separate adhesion promoter is added to the composite to enhance bonding between the polymeric matrix and the added particulates. Suitable organic particulates include fullerenes, activated carbon, rubber, rubber-reinforced polymers, and other organic particulates sold as "impact modifiers" for composites.

The preferred particulates for use in the present composite coating exhibit a wet glass transition temperature (Tg) for enhanced structural reinforcement that is greater than the glass transition temperature of the cured (or as substantially fully cured as the coating becomes in use) coating resin as well as the expected operating temperature where the proppant will be used. For enhanced impact resistance, the proppant formulator would use particulates with a Tg that is lower than that of the coating or lower than the expected operating temperature where the proppant will be used. Even more preferably, the added particulate is, or can be made to be, reactive towards the chemistry of the resin coating so that the particulate remains firmly attached and/or chemically grafted into or onto the coating of the proppant.

Suitable forms of particulate materials include dispersions, short fibers and powders (collectively referred to herein as "particulates") of finely divided, functionalized or non-functionalized metals, metal oxides, metalloids, and ceramics e.g., silica, silicon carbide (particles, whiskers or milled whisker forms), alumina, aluminosilicates, spent cracking catalysts, bauxite, ceramics, and the like. Especially preferred inorganic materials are functionalized forms of silica or dispersions or powders of silica to which an external coupling agent has been added to enhance the bond between the added silica and the surrounding polymeric matrix of the proppant coating.

If used in the composite coating around the proppant core solid according to the invention, fibers may be any of various kinds of commercially available short fibers or crystalline whiskers. Such fibers include at least one type of milled glass fiber, milled ceramic fiber, milled carbon fiber, natural fiber, crystalline inorganic forms including forms having a ratio of length to diameter within the range of 1-100 (e.g., particles to whiskers), and synthetic fibers, e.g., cross-linked novolac fibers, having a softening point above typical starting temperature for blending with resin, e.g., at least about 93° C. (200° F.), so as to not degrade, soften or agglomerate. The typical glasses for fibers include E-glass, S-glass, and AR-glass. E-glass is a commercially available grade of glass fibers typically employed in electrical uses. S-glass is used for its strength. AR-glass is used for its alkali resistance. The carbon fibers are of graphitized carbon. The ceramic fibers are typically alumina, porcelain, or other vitreous material.

Fiber lengths range from about 6 microns to about 3200 microns (about 1/8 inch). Preferred fiber lengths range from about 10 microns to about 1600 microns. More preferred fiber lengths range from about 10 microns to about 800 microns. A typical fiber length range is about 0.001 to about 1/16 inch. Preferably, the fibers are shorter than the greatest length or depth of the coating on the proppant. Suitable, commercially available fibers include milled glass fiber having lengths of 0.1 to about 1/32 inch. Additional fibers include milled ceramic fibers that are typically about 6 to 250 microns long, milled carbon fibers that are within the range of 50 to 350 microns long, and KEVLAR aramid fibers of 6 to 250 microns long. Fiber diameter (or, for fibers of non-circular cross-section, a hypothetical dimension equal to the diameter of a hypothetical circle having an area equal to the cross-sectional area of the fiber) range from about 1 to about 20 microns. Length to aspect ratio (e.g., length to diameter ratio) may range from about 5 to about 250. The fiber may have a round, oval, square, rectangular or other appropriate cross-section.

One source of the fibers of rectangular cross-section may be chopped sheet material. Such chopped sheet material would have a length and a rectangular cross-section. The rectangular cross-section has a pair of shorter sides and a pair of relatively longer sides. The ratio of lengths of the shorter side to the longer side is typically about 1:2-10. The fibers may be straight, crimped, curled or combinations thereof. See McDaniels et al. U.S. Pat. No. 6,632,527 which is hereby incorporated by reference.

Functionalized inorganic particulates that are particularly useful in the present invention are prepared by reacting the inorganic particle with one or more organic agents that bond to the surface of the underlying particle and provide one or more reactive sites over the surface of the particle that can be used to bond or enhance the bond between a polymeric phase and the functionalized particulates dispersed therein. Silica is one such particle that has been functionalized in a variety of ways. See U.S. Pat. No. 5,168,082 (functionalizing group attached to the silica sol is a branched or straight chain silane including at one end a hydrophilic moiety and at another end a silicon anchor group); U.S. Pat. No. 5,330,836 (polyfunctional silica particulates); U.S. Pat. No. 6,486,287 and U.S. Pat. No. 7,129,308 (functionalized silicon for silica surfaces); U.S. Pat. No. 6,809,149 (silica with 3-methacryloxypropylsilyl and/or glycidyloxypropylsilyl groups on the surface); and published US Patent Application Publication Nos. 2004/0138343 (colloidal silica functionalized with at least one organoalkoxysilane functionalization agent and subsequently functionalized with at least one capping agent); 2007/0238088 (functionalized silica compositions by reacting acidic silica particulates with hydrophilic organosilanes); 2008/0063868 (silica nano-sized particulates having polyethylene glycol linkages); and 2013/0005856 (amine-functionalized silica particulates coupled to at least one group chosen from primary amines, secondary amines, tertiary amines, and quaternary ammonium groups). The contents of these, and all other patents and published applications mentioned herein are hereby incorporated by reference.

For the present invention, finely divided particulates of silica, alumina, aluminosilicate, or ceramic particulates, whether functionalized or not functionalized, are preferred particulates for the composite coating. Through the hydrolysis of tetraalkyl orthosilicates, disperse particulates of colloidal silica can be prepared. The surface of these particulates has been modified to stabilize them in water or organic solvents. Surface modified colloidal silica particulates are referred to as functionalized, as are the resulting colloidal solutions, or sols. The surface of a formed alumina, or aluminosilicate can also be functionalized with a chemical moiety or chemical material, such as an organic ligand, like a surfactant, and can provide surface wetting properties which can assist in grafting the added particle into the polymer of the coating or providing bonding functionalities that assist in resilient incorporation of the particle into the proppant coating. Indeed, particulates that have been functionalized to include isocyanate-terminated moieties are useful to add isocyanate functionality to a polyurethane or polyurea-based polymer coating matrix.

If functionalized, the preferred functionalizing agents are those that are compatible with silica surfaces, such as the silicon compounds of U.S. Pat. Nos. 6,486,287 and 7,129,308 that are made with a silicon compound comprising a silicon atom and a derivatizable functional group. In a preferred embodiment, the functionalized silicon compound is a functionalized silylating agent and includes an activated silicon group and a derivatizable functional group. As used herein, the term "derivatizable functional group" refers to a functional group that is capable of reacting to permit the formation of a covalent bond between the silicon compound and another substance, such as a polymer. Exemplary derivatizable functional groups include hydroxyl, amino, carboxy, thiol, epoxy, amide, and isocyano, as well as modified forms thereof, such as activated or protected forms. Derivatizable functional groups also include substitutable leaving groups such as halo or sulfonate. One preferred embodiment has a derivatizable functional group, such as a hydroxyl group, that is capable of reacting with the isocyanate (—N=C=O) groups that are found within the polyurethane or polyurea-type coatings on the proppant. Another preferred embodiment uses a derivatizable group (e.g., —Si(OMe)$_3$; —SiMe(OMe)$_2$; —SiMeCl$_2$; SiMe(OEt)$_2$; SiCl$_3$ and —Si(OEt)$_3$) that can react with hydroxyl functionalities found within the polyurethane, polyurea-type, furan, furyl alcohol and phenolic coatings on the proppant.

If nonfunctionalized reinforcing particulates are used for the present composite proppant coating, an adhesion promoter is desirably used to enhance the wetting and/or surface bonding between the added particle and the polymeric coating. The adhesion promoter is preferably a silane or, more preferably, an organofunctionalized silane.

Silanes are a particularly preferred type of adhesion promoter agent that improves the affinity of the coating resin for the surface of the proppant core solid and is particularly useful when sand is the proppant core. As noted in copending U.S. patent application Ser. No. 13/897,288 entitled "Proppant With Enhanced Interparticle Bonding" filed on 17 May 2013, the disclosure of which is hereby incorporated by reference, adhesion promoters can be used in an outer layer portion of a proppant coating to provide bonding sites for enhancing the interparticle bonding of proppants bearing a similarly functionalized external surface.

For the present invention, silanes can be mixed in as adhesion promoters in the first step of the coating process, but can also be converted chemically with reactive constituents of the polyol component or of the isocyanate component. Functional silanes such as amino-silanes, epoxy-, aryl- or vinyl silanes are commercially available. The amino-silanes are preferred for silica-based core solids. For ceramic core solids, organofunctional zirconates or titanates are preferred, e.g., ethyltitanate.

Suitable organofunctional silanes for use in the present invention as adhesion promoters include those with the structure:

Si(R1)(R2)(R3)(R4), in which R1, R2, R3, and R4 may the same or different and are independently selected from the group consisting of hydrogen, hydroxy, hydroxyalkyl, alkyl, haloalkyl, alkylene, alkynyl, alkoxy, alkynoxy, aryl, aryloxy, substituted aromatic, heteroaromatic, amino, aminoalkyl, arylamino, epoxide, thiol, and haloalkyl, ether, ester, urethane, amide, provided that at least one of R1, R2, R3, and R4 comprises an organic moiety. Preferably, the organofunctional silane coupling agent includes an organic functionality selected from the group consisting of methyl, epoxide, epoxy/melamine, amino, mercapto, chloropropyl, methacryl, methacryloxy, vinyl, benzylamino, ureido, tetrasulfido, and C1-C4 alkoxy groups.

Alternatively, the organofunctional silane is selected from the group consisting of mercaptosilanes possessing at least one hydroxyalkoxysilyl group and/or a cyclic dialkoxysilyl group, blocked mercaptosilane possessing at least one hydroxyalkoxysilyl group and/or a cyclic dialkoxysilyl group; mercaptosilanes in which the silicon atoms of the mercaptosilane units are bonded to each other through a bridging dialkoxy group, each silane unit optionally possessing at least one hydroxyalkoxysilyl group or a cyclic dialkoxysilyl group; blocked mercaptosilane dimers in which the silicon atoms of the blocked mercaptosilane units are bonded to each other through a bridging dialkoxy group, each silane unit optionally possessing at least one hydroxyalkoxysilyl group or a cyclic dialkoxysilyl group; silane dimers possessing a mercaptosilane unit the silicon atom of which is bonded to the silicon atom of a blocked mercaptosilane unit through a bridging dialkoxy group, each silane unit optionally possessing at least one hydroxyalkoxysilyl group or a cyclic dialkoxysilyl group; mercaptosilane oligomers in which the silicon atoms of adjacent mercaptosilane units are bonded to each other through a bridging dialkoxy group, the terminal mercaptosilane units possessing at least one hydroxyalkoxysilyl group or a cyclic dialkoxysilyl group; blocked mercaptosilane oligomers in which the silicon atoms of adjacent blocked mercaptosilane units are bonded to each other through a bridging dialkoxy group, the terminal mercaptosilane units possessing at least one hydroxyalkoxysilyl group or a cyclic dialkoxysilyl group; and silane oligomers possessing at least one mercaptosilane unit and at least one blocked mercaptosilane unit, the silicon atoms of adjacent silane units being bonded to each other through a bridging dialkoxy group, the terminal silane units possessing at least one hydroxyalkoxysilyl group or a cyclic dialkoxysilyl group.

Specific examples of useful organofunctional silane coupling agents for use in enhancing the bond strength or wetting characteristics between nonfunctionalized reinforcing particulates and the polymeric coating of the proppants according to the invention include 3-glycidyloxypropyltrimethoxysilane, 3-glycidyloxypropyltriethoxysilane, 2-(3,4-epoxycyclohexyl)ethyltrimethoxysilane, and 2-(3,4-epoxycyclohexyl)ethyltriethoxysilane; 3-[2-(2-aminoethylamino)ethylamino]propyl-trimethoxysilane (CAS No. 35141-30-1); 3-mercaptopropyl-trimethoxysilane (CAS No. 4420-74-0); n-propyltrimethoxysilane (CAS No. 1067-25-0); [3-(2-aminoethyl)aminopropyl]trimethoxysilane (CAS No. 1760-24-3); silane n-dodecyltrimethoxysilane (CAS No. 3069-21-4); bis(trimethoxysilylpropyl) amine (CAS No. 82985-35-1); 1,2-bis(trimethoxysilyl)ethane (CAS No. 18406-41-2); vinyltri(2-methoxyethoxy) silane (CAS No. 1067-53-4); n-octyltriethoxysilane (CAS No. 2943-75-1); bis[3-(triethoxysilyl) propyl]tetrasulfide (CAS No. 40372-72-3); vinyltriethoxysilane (CAS No. 78-08-0); 3-glycidoxypropyl-trimethoxysilane (CAS No. 2530-83-8); 3-mercaptopropyl-triethoxysilane (CAS No. 14814-09-6); 3-glycidoxypropyl-triethoxysilane (CAS No. 2602-34-8); 2-(3,4-epoxycyclohexyl)ethyl]trimethoxysilane (CAS No. 3388-04-3); 3-aminopropyltrimethoxysilane (CAS No. 13822-56-5); 2-(3,4-epoxycyclohexyl)ethyl]triethoxysilane (CAS No. 10217-34-2); 3-aminopropyltriethoxysilane (CAS No. 919-30-2); 3-glycidoxypropyl-methyldimethoxysilane (CAS No. 65799-47-5); bis (triethoxysilylpropyl)amine (CAS No. 13497-18-2); 3-(2-aminoethylamino) propyldimethoxymethylsilane (CAS No. 3069-29-2); N-(n-Butyl)-3-aminopropyltri-methoxysilane (CAS No. 31024-56-3); n-propyltriethoxysilane (CAS No. 2550-02-9); vinyltrimethoxysilane (CAS No. 2768-02-7); 3-ureidopropyltriethoxy-silane (CAS No. 23779-32-0); 3-methacryloxypropyl-trimethoxysilane (CAS No. 2530-85-0).

Another type of organofunctional silanes that are useful in the present invention are silane-terminated polymers, such as silane-terminated polyethers and polyurethanes. These polymers are formed by reaction of for instance a polyether polymer with isocyanate termination with aminosilanes or a polyether polymer with amino termination and/or hydroxyl termination with isocyanate-terminated silanes. Reactions of the reactive groups with other materials in the composition are also possible to create other cross-links. Silane-terminated polymers (STP) or silane-modified polymers (MS) can be all pre-polymers which at the chain ends—or laterally—carry silyl groups having at least one hydrolysable bond but which in the polymer framework, do not display the siloxane bond $(SiR_2O)n$ that is typical of silicones. Two preferred silane-terminated polymers are illustrated by Formulas 1 (a dimethoxy(methyl) silylmethyl carbamate-terminated polyether) and Formula 2:

Formula 1

-continued

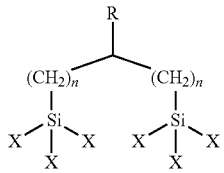

Formula 2

Wherein for Formula 1: Polyether refers to a polyether chain having 1-200 carbon atoms. See also published U.S. Pat. Nos. 3,971,751 and 6,207,766 as well as US patent application publication number US 2007/0088137, the disclosures of which are hereby incorporated by reference.

Wherein for Formula 2: R is an amine group; each X in Formula 5 can each be independently selected from the group consisting of hydrogen, alkoxy, halogen, and hydroxyl; and n is an integer that is greater than zero. Such agents are commercially available from Wacker Chemie AG, Hanns-Seidel-Platz 4, 81737 Munchen, Germany under the designation Geniosil® STP-E.

The dipodal silane-terminated polyether-based polymers of Formulas 1 and 2 are compatible or miscible with polyether polyols that can be used as the polyol component for making a polyurethane proppant coating. Such silane-terminated polyether-based polymers are easily blended with polyether polyols as a last step top-coat to provide an adhesive coating layer for coated proppants according to the invention. The dipodal amino silane of Formula 4 in the form of bis(trimethoxysilylpropyl)amine has been used as a coupling agent in the proppants industry for "difficult" substrates. In the present invention, this silane could provide two silane, adhesive-like, functionalities for every amine grafting moiety.

The length of the carbon chain in the alkoxy moieties (e.g., methoxy vs. ethoxy vs. propoxy vs. butoxy) determines the rate of hydrolysis of the silane. So, the choice of the length of the alkoxy carbon chain can be used to provide control over the resulting moisture and water resistance. Increasing resistance is seen as the alkyl chain increases. Longer carbon length chains will also delay the hydrolysis and, therefore, the bonding performance of the proppant in the fracture.

The size of the added particulates for the composite should be selected based on the coating thickness on the core solid of the proppant and can be in the form of sols, colloids, suspensions or dry powders. Preferably, the added particulates do not extend substantially above the upper surface of the coating or interfere with handling, transport and injection of the coated proppant. Suitable sizes are generally within the range from about 5 nm to about 1500 nm. Preferably, the added particulates exhibit an average particle size within the range from about 5 nm to less than 1000 nm and more preferably within the range of about 8-20 nm. In one embodiment, the average particle size of the added hard, crush-resistant, inorganic particulates may be selected from the range of about 5 nm to about 500 nm.

Preferably, the reinforcing particulates used in the present invention are added as an aqueous suspension as a separate stream or admixed with a compatible coating component. Water addition can be particularly useful for polyurethane and polyurea-based coatings. See copending U.S. patent application Ser. No. 13/355,969 entitled "Manufacture of Polymer Coated Proppants", the disclosure of which is hereby incorporated by reference.

The amount of added functionalized inorganic particulates can be within a substantial range, depending on the polymer and coating thickness used on the proppant. In general, useful amounts are within the range of about 2-85 vol % solids in the proppant coating based on the volume of the coating. Preferred amounts are within the range of 2-65 vol % solids and even more preferably 5-30 vol % solids in the proppant coating.

The Polymeric Coating

A wide variety of polymers can be used as coating for proppants of the present invention. Indeed, the coating can be thermoset or thermoplastic and may formed in one or more layers that are the same, different, analogues or homologues of the other and any intervening proppant coating layers. Suitable polymeric coatings include resins based on polyurethane, polyurea-type, phenolic, epoxy, polycarbodi-imide, or polyester resins. A preferred, multilayer proppant uses a first coating layer made from a precured phenolic coating with a second coating layer made with a polyurethane or polyurea-based coating (for providing interparticle bond strength). The reinforcing particulates of the present invention would be on or in the second coating layer.

The preferred proppant coatings for the present invention and their manufacture are described in co-pending U.S. patent application Ser. No. 13/099,893 (entitled "Coated and Cured Proppants"); Ser. No. 13/188,530 (entitled "Coated and Cured Proppants"); Ser. No. 13/626,055 (entitled "Coated and Cured Proppants"); Ser. No. 13/224,726 (entitled "Dual Function Proppants"); Ser. No. 13/355,969 (entitled "Manufacture of Polymer Coated Proppants"); and Ser. No. 13/837,396 (entitled "Proppant With Polyurea-Type Coating"), the disclosures of which are herein incorporated by reference.

Particularly preferred proppant coatings as the inner and/or outer layers are those using polyurea-based or, with the use of a polyol, polyurethane-based polymers. See copending U.S. patent application Ser. No. 13/355,969, entitled "Manufacture of Polymer Coated Proppants."

The polyurea-type coating is preferably formed on the proppant from a dynamically reacting mixture that comprises an isocyanate, water and a curing agent (preferably an aqueous solution containing a curing agent or catalyst) that have been simultaneous contacted and mixed in the presence of the proppant core. While not wishing to be bound by theory of operation, the controlled rates of substantially simultaneous water and isocyanate are believed to allow the water to form a reactive amine species from the isocyanate, which newly-formed amine then reacts with other, unconverted isocyanate to form the desired polyurea-type coating directly on the outer surface of the proppant solid. Thus, the simultaneous contact among the ingredients forms a reacting mixture that polymerizes to form a thin, hard, substantially foam-free coating directly on the outer surface of the proppant core. Indeed, the selection of different feed start times and rate for the isocyanate and water phase can be chosen to produce a gradient of polyurea-type polymers within in the coating. If the sand has been heated in advance of the contact, the reaction can proceed substantially to completion in less than about four minutes to form a hard, substantially fully-cured coating that does not require post-curing to form a tack-free or substantially tack-free outer surface.

Alternatively and less preferably, a polyurea-type coating can be formed on the proppant core by serially adding polyurea-type precursor components to the mixer. Such a process would likely need, however, sufficient agitation and mixing to avoid boundary layer effects from the first-added component that would cover the surface of the proppant core to a certain depth which might inhibit a complete reaction of all of the first material down to the surface of the proppant core solid. Sufficient agitation would be used to force the second component into the boundary layer of first component so that the first component boundary layer reacts downwardly from its outer surface towards the outer surface of the proppant core to form linkages that are tightly adhered to the proppant core surface.

Similar concerns would occur if the proppant core had been stored under external conditions and had become wet. It would be desirable to heat the proppant core above about 100° C., possibly less with moving air through the solids, until the proppants are substantially dry before they are first contacted with a reactable or reacting mixture of polyurea-type precursors. Such a drying process is commonly used in processing even uncoated sand proppants, the present coating process is preferably performed in the same or adjacent facility as the drying operation so that the sensible heat introduced to the sand for drying can also be used to facilitate the formation of cured coatings on at least a portion of the processed proppant sands.

Tests on the coating to determine its glass transition temperature (Tg) when exposed to water as well as laboratory-scale tests for bond strength, such as conventional UCS testing, or conductivity can be used to evaluate the suitability of any particular coating formulation that has been prepared by a particular coating method. In particular, the Tg can be used as a guide to foretell whether a thermoplastic coating (such as the polyurethane and polyurea-based coating layers of the present invention) is potentially useable in the downhole conditions of a given fractured stratum. It is desirable that the Tg of the proppant coating be a temperature that is less than that prevailing downhole so that the thermoplastic coating has the ability to soften under prevailing combination of temperature and pressure. The Tg of the reinforcing particulates should, however, be higher than the prevailing downhole temperature so that the particulate does not soften or lessen its reinforcing effects. For the present invention and for use in high temperature wells, the Tg of the proppant coating is preferably greater than about 75° C. but less than about 200° C. and even more preferably within the range from about 100-165° C. For lower temperature wells that have downhole temperatures within the range of 20°-52° C., the Tg of the proppant coating is desirably within the range of about 20° C. to 60° C.

The Tg values that are described can differ if one is describing a wet or dry Tg test. See U.S. Pat. Nos. 3,725,358; 5,310,825; and 2010/0222461 for testing to determine the wet Tg of a resin or material, i.e., performing the determination of Tg in a thermomechanical analyzer with water added to the sample container. A dry Tg could be in the range of 130-160° C., but in a wet test, it is difficult to measure a Tg that is above 110° C. In the low temperature applications the wet Tg preferably falls into the ranges described above to promote interparticle bonding without the use of an external activator.

A preferred testing method for proppant performance is described in ISO 13503-5:2006(E) "Procedures for measuring the long term conductivity of proppants", the disclosure of which is herein incorporated by reference. The ISO 13503-5:2006 provides standard testing procedures for evaluating proppants used in hydraulic fracturing and gravel packing operations. ISO 13503-5:2006 provides a consistent methodology for testing performed on hydraulic fracturing and/or gravel packing proppants. The "proppants" mentioned henceforth in this part of ISO 13503-5:2006 refer to sand, ceramic media, resin-coated proppants, gravel packing media, and other materials used for hydraulic fracturing and gravel-packing operations. ISO 13503-5:2006 is not applicable for use in obtaining absolute values of proppant pack conductivities under downhole reservoir conditions, but it does serve as a consistent method by which such downhole conditions can be simulated and compared in a laboratory setting.

The Isocyanate Component

The isocyanate-functional component for the coatings of the present invention comprises an isocyanate-functional component with at least 2 reactive isocyanate groups. Other isocyanate-containing compounds may be used, if desired. Examples of suitable isocyanate with at least 2 isocyanate groups an aliphatic or an aromatic isocyanate with at least 2 isocyanate groups (e.g. a diisocyanate, triisocyanate or tetraisocyanate), or an oligomer or a polymer thereof can preferably be used. These isocyanates with at least 2 isocyanate groups can also be carbocyclic or heterocyclic and/or contain one or more heterocyclic groups.

The isocyanate-functional component with at least 2 isocyanate groups is preferably a compound, polymer or oligomer of compounds of the formula (III) or a compound of the formula (IV):

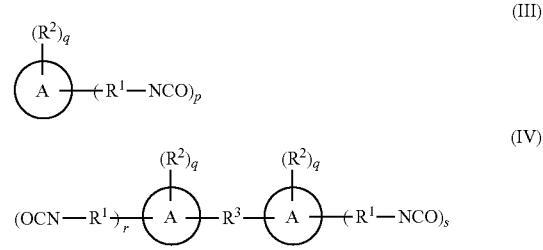

In the formulas (III) and (IV), A is each, independently, an aryl, heteroaryl, cycloalkyl or heterocycloalkyl. Preferably, A is each, independently, an aryl or cycloalkyl. More preferably A is each, independently, an aryl which is preferably phenyl, naphthyl or anthracenyl, and most preferably phenyl. Still more preferably A is a phenyl.

The above mentioned heteroaryl is preferably a heteroaryl with 5 or 6 ring atoms, of which 1, 2 or 3 ring atoms are each, independently, an oxygen, sulfur or nitrogen atom and the other ring atoms are carbon atoms. More preferably the heteroaryl is selected among pyridinyl, thienyl, furyl, pyrrolyl, imidazolyl, pyrazolyl, pyrazinyl, pyrimidinyl, pyridazinyl, oxazolyl, isoxazolyl or furazanyl.

The above mentioned cycloalkyl is preferably a $C_{3-10}$-cycloalkyl, more preferably a $C_{5-7}$-cycloalkyl.

The above mentioned heterocycloalkyl is preferably a heterocycloalkyl with 3 to 10 ring atoms (more preferably with 5 to 7 ring atoms), of which one or more (e.g. 1, 2 or 3) ring atoms are each, independently, an oxygen, sulfur or nitrogen atom and the other ring atoms are carbon atoms.

More preferably the heterocycloalkyl is selected from among tetrahydrofuranyl, piperidinyl, piperazinyl, aziridinyl, acetidinyl, pyrrolidinyl, imidazolidinyl, morpholinyl, pyrazolidinyl, tetrahydrothienyl, octahydroquinolinyl, octahydroisoquinolinyl, oxazolidinyl or isoxazolidinyl. Still more preferably, the heterocycloalkyl is selected from among tetrahydrofuranyl, piperidinyl, piperazinyl, pyrrolidinyl, imidazolidinyl, morpholinyl, pyrazolidinyl, tetrahydrothienyl, oxazolidinyl or isoxazolidinyl.

In the formulas (III) and (IV), each $R^1$ is, independently, a covalent bond or $C_{1-4}$-alkylene (e.g. methylene, ethylene, propylene or butylene). Preferably each $R^2$ is hydrogen or a covalent bond.

In the formulas (III) and (IV), each $R^2$ is each, independently, hydrogen, a halogen (e.g. F, Cl, Br or I), a $C_{1-4}$-alkyl (e.g. methyl, ethyl, propyl or butyl) or $C_{1-4}$-alkoxy (e.g. methoxy, ethoxy, propoxy or butoxy). Preferably, each $R^2$ is, independently, hydrogen or a $C_{1-4}$-alkyl. More preferably each $R^2$ is hydrogen or methyl.

In the formula (IV), $R^3$ is a covalent bond, a $C_{1-4}$-alkylene (e.g. methylene, ethylene, propylene or butylene) or a group —$(CH_2)_{R31}$—O—$(CH_2)_{R32}$—, wherein R31 and R32 are each, independently, 0, 1, 2 or 3. Preferably, $R^3$ is a —$CH_2$— group or an —O— group.

In the formula (III), the average value of p is greater than or equal to 2, preferably greater than 2, and more preferably within the range of 2.05 and up to 3.

In the formulas (III) and (IV), each q is, independently, an integer from 0 to 4, preferably 0, 1 or 2. When q is equal to 0, the corresponding group A has no substituent $R^2$, but has hydrogen atoms instead of $R^2$.

In the formula (IV), each r and s are, independently, 0, 1, 2, 3 or 4, wherein the sum of average values of r and s is greater than 2. Preferably, each the average of r and s are preferably greater than 2, and more preferably within the range of 2.05 and up to 3.

Examples of the isocyanate with at least 2 isocyanate groups are: toluol-2,4-diisocyanate; toluol-2,6-diisocyanate; 1,5-naphthalindiisocyanate; cumol-2,4-diisocyanate; 4-methoxy-1,3-phenyldiisocyanate; 4-chloro-1,3-phenyldiisocyanate; diphenylmethane-4,4-diisocyanate; diphenylmethane-2,4-diisocyanate; diphenylmethane-2,2-diisocyanate; 4-bromo-1,3-phenyldiisocyanate; 4-ethoxy-1,3-phenyl-diisocyanate; 2,4'-diisocyanate diphenylether; 5,6-dimethyl-1,3-phenyl-diisocyanate; methylenediphenyl diisocyanate (including 2,2'-MDI, 2,4'-MDI and 4,4"-MDI); 4,4-diisocyanato-diphenylether; 4,6-dimethyl-1,3-phenyl-diisocyanate; 9,10-anthracene-diisocyanate; 2,4,6-toluol triisocyanate; 2,4,4'-triisocyanatodiphenylether; 1,4-tetramethylene diisocyanate; 1,6-hexamethylene diisocyanate; 1,10-decamethylene-diisocyanate; 1,3-cyclohexylene diisocyanate; 4,4'-methylene-bis-(cyclohexylisocyanate); xylol diisocyanate; 1-isocyanato-3-methyl-isocyanate-3,5,5-trimethylcyclohexane (isophorone diisocyanate); 1-3-bis(isocyanato-1-methylethyl)benzol (m-TMXDI); 1,4-bis(isocyanato-1-methylethyl)benzol (p-TMXDI); oligomers or polymers of the above mentioned isocyanate compounds; or mixtures of two or more of the above mentioned isocyanate compounds or oligomers or polymers thereof. A variety of polymeric isocyanates can be used in the present invention. Suitable examples include polymers and oligomers of diphenylmethane diisocyanates (MDIs and pMDIs), toluene diisocyanates (TDIs), hexamethylene diisocyanates (HDIs), isophorone diisocyanates (IPDIs), and combinations thereof. The preferred polymeric isocyanate for use in the present invention is polymers and oligomers based on diphenylmethane diisocyanates.

Particularly preferred isocyanates with at least 2 isocyanate groups are toluol diisocyanate, methylenediphenyl diisocyanate, diphenylmethane diisocyanate, an oligomer based on toluol diisocyanate, an oligomer based on methylenediphenyl diisocyanate (poly-MDI) or an oligomer based on diphenylmethane diisocyanate and polymers thereof.

The Polyol Component

A polyol component with polyhydroxy functionality is one of the components used in making a polyurethane coating on proppant solids in a process according to the invention, and it may be applied as the first component or the second component. The polyol component has two or more functional, hydroxyl moieties (such as diols, triols and higher polyol functionality based on starter molecules like glycerine, trimethylolpropane, sorbitol, methyl glucoside and sucrose) excluding hydroxyl groups associated with carboxylic acids and may or may not have reactive amine functionality. Preferred polyhydroxyl polyols include polyethers (such as polyoxypropylene diols and triols), polyesters, aliphatic polyols, aromatic polyols, mixtures of aliphatic and aromatic polyols, synthetic polyols, polyhydroxyoligomers (see U.S. Pat. Nos. 4,554,188 and 4,465,815, the disclosures of which are hereby incorporated by reference), natural oil polyols (such as cashew nut oil and castor oil) and natural oils that have been treated to introduce polyhydroxyl content in place of unsaturated bonds such as oxidized soybean oil, oxidized peanut oil, and oxidized canola oil such as polyols produced from biomass.

A preferred polyurethane coating is made with a polyol mixture that includes 5-100 wt % of one or more polyether, polyester, aliphatic and/or polyhydroxyoligomers polyols and 0-95 wt % of an aromatic polyol. An especially preferred polyol is a polyetherpolyol containing 0-5 wt % castor oil.

In a still further embodiment, the polyol component is a phenol resin with monomer units based on cardol and/or cardanol. Cardol and cardanol are produced from cashew nut oil which is obtained from the seeds of the cashew nut tree. Cashew nut oil consists of about 90% anacardic acid and about 10% cardol. By heat treatment in an acid environment, a mixture of cardol and cardanol is obtained by decarboxylation of the anacardic acid. Cardol and cardanol have the structures shown below:

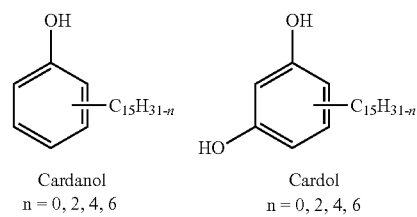

Cardanol
n = 0, 2, 4, 6

Cardol
n = 0, 2, 4, 6

As shown in the illustration above, the hydrocarbon residue (—$C_{15}H_{31-n}$) in cardol and/or in cardanol can have one (n=2), two (n=4) or three (n=6) double bonds. Cardol specifically refers to compound CAS-No. 57486-25-6 and cardanol specifically to compound CAS-No. 37330-39-5.

Cardol and cardanol can each be used alone or at any particular mixing ratio in the phenol resin. Decarboxylated cashew nut oil can also be used.

Cardol and/or cardanol can be condensed into the above described phenol resins, for example, into the resole- or novolak-type phenol resins. For this purpose, cardol and/or cardanol can be condensed e.g. with phenol or with one or more of the above defined compounds of the formula (I), and also with aldehydes, preferably formaldehyde.

The amount of cardol and/or cardanol which is condensed in the phenol resin is not particularly restricted and preferably is from about 1 wt % to about 99 wt %, more preferably about 5 wt % to about 60 wt %, and still more preferably about 10 wt % to about 30 wt %, relative to 100 wt % of the amount of phenolic starting products used in the phenol resin.

In another embodiment, the polyol component is a phenol resin obtained by condensation of cardol and/or cardanol with aldehydes, preferably formaldehyde.

A phenol resin which contains monomer units based on cardol and/or cardanol as described above, or which can be obtained by condensation of cardol and/or cardanol with aldehydes, has a particularly low viscosity and can thus preferably be employed with a low addition or without addition of reactive thinners. Moreover, this kind of long-chain, substituted phenol resin is comparatively hydrophobic, which results in a favorable shelf life of the coated proppants obtained by the method according to the present invention. In addition, a phenol resin of this kind is also advantageous because cardol and cardanol are renewable raw materials.

Apart from the phenol resin, the polyol component can still contain other compounds containing hydroxyl groups. The other compounds containing hydroxyl groups can be selected from the compounds containing hydroxyl groups that are known to be useful for making polyurethanes, e.g., hydroxy-functional polyethers, hydroxy-functional polyesters, alcohols or glycols. One preferred compound containing hydroxyl groups is, for instance, castor oil. Compounds containing hydroxyl groups such as alcohols or glycols, in particular cardol and/or cardanol, can be used as reactive thinners.

Curing Agents and Catalysts

The coatings of the invention can be cured with at least one of a variety of curing agents, including reactive, non-reactive (e.g., "catalysts") and partially reactive agents that facilitate the formation of polyurea-type linkages. Generally, the preferred curing agents are selected from the amine-based curing agents and are added to the reacting mixture of polyurea-type precursors at a total amount within the range from about 0.0001% to about 30 total wt %. The amine-based curing agents may also be used as a mixture of a fast-acting first curing agent and a second, latent curing agent if additional crosslinking ability is desired to take advantage of downhole heat and pressure conditions. Either of these first and/or second amine-based curing agents may be reactive, nonreactive or partially reactive. If the amine curing agent is reactive, however, the amine is preferably chosen to favor the formation of polyurea by reaction with the isocyanate.

Suitable single amine-based curing agents, catalysts or a mixture of amine-based curing agents for promoting the formation of polyurea can include, but are not limited to, 2,2'-dimorpholinodiethyl ether; bis-dimethylaminoethylether; ethylene diamine; hexamethylene diamine; 1-methyl-2,6-cyclohexyl diamine; 2,2,4- and 2,4,4-trimethyl-1,6-hexanediamine; 4,4'-bis-(sec-butylamino)-dicyclohexylmethane and derivatives thereof; 1,4-bis-(sec-butylamino)-cyclohexane; 1,2-bis-(sec-butylamino)-cyclohexane; 4,4'-dicyclohexylmethane diamine; 1,4-cyclohexane-bis-(methylamine); 1,3-cyclohexane-bis-(methylamine), isomers, and mixtures thereof; diethylene glycol bis-(aminopropyl)ether; 2-methylpentamethylene-diamine; diaminocyclohexane, isomers, and mixtures thereof; diethylene triamine; triethylene tetramine; tetraethylene pentamine; propylene diamine; 1,3-diaminopropane; dimethylamino propylamine; diethylamino propylamine; imidobis-(propylamine); monoethanolamine, diethanolamine; triethanolamine; monoisopropanolamine, diisopropanolamine; isophoronediamine; 4,4'-methylenebis-(2-chloroaniline); 3,5-dimethylthio-2,4-toluenediamine; 3,5-dimethylthio-2,6-toluenediamine; 3,5-diethylthio-2,4-toluenediamine; 3,5-diethylthio-2,6-toluenediamine; 4,4'-bis-(sec-butylamino)-benzene; and derivatives thereof; 1,4-bis-(sec-butylamino)-benzene; 1,2-bis-(sec-butylamino)-benzene; N,N'-dialkylamino-diphenylmethane; trimethyleneglycol-ci-p-aminobenzoate; polytetramethyleneoxide-di-p-aminobenzoate; 4,4'-methylenebis-(3-chloro-2,6-diethyleneaniline); 4,4'-methylenebis-(2,6-diethylaniline); meta-phenylenediamine; paraphenylenediamine; N,N'-diisopropyl-isophoronediamine; polyoxypropylene diamine; propylene oxide-based triamine; 3,3'-dimethyl-4,4'-diaminocyclohexylmethane; and mixtures thereof. In one embodiment, the amine-terminated curing agent is 4,4'-bis-(sec-butylamino)-dicyclohexylmethane. Preferred amine-based curing agents and catalysts that aid the —NCO— and water reaction to form the polyurea-type links for use with the present invention include triethylenediamine; bis(2-dimethylaminoethyl)ether; tetramethylethylenediamine; pentamethyldiethylenetriamine; 1,3,5-tris(3-(dimethylamino)propyl)-hexahydro-s-triazine and other tertiary amine products of alkyleneamines.

Additionally, other catalysts that promote the reaction of isocyanates with hydroxyls and amines that are known by the industry can be used in the present invention, e.g., transition metal catalysts of Groups III or IV used for polyurea-type foams. Particularly preferred metal catalysts include dibutyltin dilaurate that can be added to the water or polyol feeds for co-introduction during the coating process.

Also preferred are catalysts that promote isocyanate trimerization over other reaction mechanisms. See, e.g., U.S. Pat. No. 5,264,572 (cesium fluoride or tetraalkylammonium fluoride), U.S. Pat. No. 3,817,939 (organic carbonate salt), and U.S. Pat. No. 6,127,308 (lithium salts, lithium hydroxide, allophane catalysts such as tin-2-ethylhexanoate or tin octoate, and organic compounds containing at least one hydroxyl group), the disclosures of which are herein incorporated by reference. Phosphorous-based catalysts have been used to promote the formation of polycarbodiimides (see the examples in Tanguay et al. US 2011/0297383) and are not preferred for use in the present invention.

The amine-based curing agent may have a molecular weight of about 64 or greater. In one embodiment, the molecular weight of the amine-curing agent is about 2000 or less and is a primary or secondary amine. Tertiary amines will not generally be used as a reactant for forming polyurea-type coatings unless reactivity is provided by additional functionality, e.g., such as with triethanolamine.

Of the list above, the saturated amine-based curing agents suitable for use to make polyurea-type coatings according to the present invention include, but are not limited to, ethylene diamine; hexamethylene diamine; 1-methyl-2,6-cyclohexyl diamine; 2,2,4- and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino-cyclohexane; derivatives of 4,4'-bis-(sec-butylamino)-dicyclohexylmethane; 4,4'-dicyclohexylmethane diamine; 1,4-cyclohexane-bis-(methylamine); 1,3-cyclohexane-bis-(methylamine); diethylene glycol bis-(aminopropyl)ether; 2-methylpentamethylene-diamine; diaminocyclohexane;

diethylene triamine; triethylene tetramine; tetraethylene pentamine; propylene diamine; dipropylene triamine; 1,3-diaminopropane; dimethylamino propylamine; diethylamino propylamine; imido-bis-(propylamine); monoethanolamine, diethanolamine; monoisopropanolamine, diisopropanolamine; isophoronediamine; N,N'-diisopropylisophorone diamine and mixtures thereof.

In one embodiment, the curative used with the prepolymer include 3,5-dimethylthio-2,4-toluenediamine, 3,5-dimethyl-thio-2,6-toluenediamine, 4,4'-bis-(sec-butylamino)-diphenylmethane, N,N'-diisopropyl-isophorone diamine; polyoxypropylene diamine; propylene oxide-based triamine; 3,3'-dimethyl-4,4'-diaminocyclohexylmethane; and mixtures thereof.

Because unhindered primary diamines result in a rapid reaction between the isocyanate groups and the amine groups, in certain instances, a hindered secondary diamine may be more suitable for use. Without being bound to any particular theory, it is believed that an amine with a high level of stearic hindrance, e.g., a tertiary butyl group on the nitrogen atom, has a slower reaction rate than an amine with no hindrance or a low level of hindrance and further adds to the hydrolytic and thermal stability of the final product. For example, 4,4'-bis-(sec-butylamino)-dicyclohexylmethane (CLEARLINK 1000® from Huntsman Corporation in The Woodlands, Tex.) may be suitable for use in combination with an isocyanate to form the polyurea-type coating. In addition, N,N'-diisopropyl-isophorone diamine, also available from Huntsman Corporation, under the tradename JEFFLINK®, may be used as the secondary diamine curing agent.

In addition, a trifunctional curing agent can be used to help improve cross-linking and, thus, to further improve the chemical and/or abrasion resistance of the coating. In one embodiment, a diethylene triamine or triethylene tetramine are both highly reactive and are desirably added to the coating process with water.

The curing agents of the present invention can be added to the coating formulation simultaneously as any of these components or pre-coated on the proppant. Preferably, the curing agent and the reinforcing particulates are co-applied with water at substantially the same time that isocyanate is added to form the proppant coating.

Additives

The proppant coating compositions of the invention may also include various additives that change its appearance, properties, handling characteristics or performance as a proppant or in fracturing or breaker fluids. For example, the coatings of the invention may also include pigments, tints, dyes, and fillers in an amount to provide visible coloration in the coatings. Other materials include, but are not limited to, reaction rate enhancers or catalysts, crosslinking agents, optical brighteners, propylene carbonates, coloring agents, fluorescent agents, whitening agents, UV absorbers, hindered amine light stabilizers, defoaming agents, processing aids, mica, talc, nanometer-sized fillers that add an additional function to the proppant, silane coupling agents (such as those in U.S. Pat. No. 4,585,064), anti-slip agents, water affinity or repulsion components, water-activated agents, viscosifiers for the proppant coating operation or for release into a frac fluid, flowaids, anticaking agents, wetting agents, polymeric coating toughening agents such as one or more block copolymers, and components that act to remove at least some portion of the heavy metals and/or undesirable solutes found in subterranean groundwater. See, copending U.S. patent application Ser. No. 13/224,726 filed on 1 Sep. 2011 entitled "Dual Function Proppants", the disclosure of which is herein incorporated by reference. The amount of any of these specific additives will be readily determinable by those skilled in the art with no more than routine tests. Preferably, they are present in an amount of about 15 weight percent or less.

Adhesion promoter agents can be used to increase the bond strength between the outer surface of the proppant core solid and any applied coating. An adhesion promoter can also be used at the outer surface or outside of the outermost coating layer to enhance adhesion between adjacent proppants. See copending U.S. application Ser. No. 13/897,288 entitled "Proppant With Enhanced Interparticle Bonding", the disclosure of which is hereby incorporated by reference. The adhesion promoter for enhancing the bond between the proppant core solid and the applied polymeric coating may be the same or different than the adhesion promoter that might be added to help bond the added reinforcing particulates into the polymeric coating. Preferably, they are the same or from the same class of compounds. The adhesion promoter for a nonfunctionalized particulate for both the core-polymer bonding as well as the polymer-reinforcing particulate bond can be added at the beginning of the coating process, throughout the coating process or towards the end of the coating process.

An especially preferred treatment for the cured proppant is to use an anticaking to enhance the handling characteristics of the proppants. Suitable anticaking agents include amorphous silica (e.g., silica flour, fumed silica and silica dispersions) and silica alternatives (such as those used in sandblasting as an alternative to silica or organofunctional silane like the DYNASYLAN fluids from Evonik Degussa Corporation in Chester, Pa.). These materials are applied to the outer surfaces of the coated proppant solid to prevent the formation of agglomerates during packing and shipping. Amorphous silica is preferably applied in an amount generally within the range from about 0.001 wt % to about 1 wt % based on the dry proppant weight.

An optional additional additive to the coating or in particulates blended with the proppants of the present invention is a contaminant removal component that will remove, sequester, chelate or otherwise clean at least one contaminant, especially dissolved or otherwise ionic forms of heavy metals and naturally occurring radioactive materials (NORMS), from subterranean water or hydrocarbon deposits within a fractured stratum while also propping open cracks in said fractured stratum. Preferably, the contaminant removal component is associated with the proppant solid as a chemically distinct solid that is introduced together with the proppant solid as: (a) an insoluble solid secured to the outer or inner surface of the proppant solid with a coating formulation that binds the solids together, (b) as a solid lodged within pores of the proppant solid or (c) as a chemical compound or moiety that is mixed into or integrated with a coating or the structure of the proppant solid. See copending U.S. patent application Ser. No. 13/224,726 filed on 2 Sep. 2011 entitled "Dual Function Proppants" the disclosure of which is herein incorporated by reference. Additional added functionality can also be in the form of fracture fluid breakers, de-emulsifiers, and bactericides.

The added functionality of an auxiliary particle to the proppant may also be in the form of an ion exchange resin that is pretreated or which itself constitutes a dissolvable solid for the slow release of corrosion or scale inhibitors. Such slow release materials could prove beneficial and advantageous to the overall operation and maintenance of the well.

Proppant Core Solids

The proppants can be virtually any small solid with an adequate crush strength and lack of chemical reactivity. Suitable examples include sand, ceramic particulates (such as aluminum oxide, silicon dioxide, titanium dioxide, zinc oxide, zirconium dioxide, cerium dioxide, manganese dioxide, iron oxide, calcium oxide, magnesium oxide, or bauxite), or also other granular materials.

Proppant sands are a preferred type of proppant for the present invention. Sand is mainly used in the hydraulic fracturing process of natural gas and oil wells to increase their productivity of valuable natural resources. Proppant sand is monocrystalline with a high silica content of at least 80 wt %, and more typically has a silica content of greater than about 97 wt % silica.

The American Petroleum Institute specifications place the following limitations on sieve distribution for proppants suitable for use in hydraulic fracturing:
- At least 90% of material must fall between the two mesh sizes,
- No more than 10% of the material may be coarser than the largest mesh size,
- No more than 0.1% of the material may be coarser than the next largest mesh size, e.g. for 20/40, up to 10% of the proppant may be between 16 and 20 mesh, but no more than 0.1% can exceed 16 mesh, and
- No more than 1% of material is permitted to fall onto the pan.

Proppants are divided into low-density, medium density, high-density when determined in bulk. Proppant crush strengths are divided into 52 MPa, 69 MPa, 86 MPa and 103 MPa series. The size specifications of proppant sand are generally 12-18 mesh, 12-20 mesh, 16-20 mesh, 16-30 mesh, 20-40 mesh, between 30-50 mesh, 40-60 mesh, 40-70 mesh and smaller. The proppants to be coated preferably have an average particle size within the range from about 50 μm and about 3000 μm, and more preferably within the range from about 100 μm to about 2000 μm.

Coating Method

The coating process of the present invention preferably produces a polyurethane or polyurea-type coating on the proppant core solids that is hard, durable and resists dissolution under the rigorous combination of high heat, agitation, abrasion and water found downhole in a fractured subterranean formation. Preferably, the cured coating exhibits a sufficient resistance (as reflected by a 10 day autoclave test or 10 day conductivity test) so that the coating resists loss by dissolution in hot water ("LOI loss") of less than 25 wt %, more preferably less than 15 wt %, and even more preferably a loss of less than 5 wt %. The substantially cured coating of the invention thus resists dissolution in the fractured stratum while also exhibiting sufficient consolidation and resistance to flow back without the use of an added bonding activator while also exhibiting sufficiently high crush strength to prop open the fractures and maintain their conductivity for extended periods.

The temperature of the coating process is not particularly restricted outside of practical concerns for safety and component integrity. The preferred conditions for the coating/curing step of the present invention are generally at conditions within the range of about 50° to about 225° C., more preferably at a temperature within the range from about 75° C. to about 150° C., and most preferably at a temperature within the range from about 80° C. to about 135° C. As noted above, this temperature is conveniently achieved by heating or using heated proppant solids. The preferred temperature range avoids a number of emissions issues, reduces the amount of energy consumed in the coating process and also reduces the cooling time for the coated proppants for further handling and packaging.

Mixing can be carried out on a continuous or discontinuous basis in series or in several runs with a single mixer, but the specific mixer used to coat the proppants is not believed to be critical for the present invention. Suitable mixers include tumbling-type mixers, fluid beds, a pug mill mixer or an agitation mixer can be used. For example, a drum mixer, a plate-type mixer, a tubular mixer, a trough mixer or a conical mixer can be used. The easiest way is mixing in a rotating drum. As continuous mixer, a worm gear can, for example, be used.

A preferred mixer type is a tumbling-type mixer that uses a rotating drum driven by an electrical motor. The load on the motor can be used as a measure of the viscosity of the tumbling solids and the degree to which they are forming agglomerates or resinous deposits inside the mixer: the electrical load on the motor increases as the agglomeration and fouling increase. Adding water to the mixing solids or adding one or more of the polyurea precursor components in an aqueous solution, emulsion or suspension can help to reduce this load increase and retain the free-flowing nature of the mixing solids, thereby enabling even larger productivity from the mixer.

As noted above, water is preferably added to the isocyanate at a rate sufficient to form a reactive amine species which then reacts almost immediately with adjacent isocyanate to form polyurea. Preferably, water and an isocyanate-containing component are used in an amount within the range from about 5-30% water, 95-70% ISO consistent with the demands of the catalyst to promote the hydrolysis of the ISO and temperature of the substrate during the timed additions onto the proppant substrate. The water and isocyanate are added at a rate sufficient to maintain a proportion of 5-30 to 95-70 so as to promote the in-situ formation of a reactive amine component from the isocyanate which then reacts with unconverted isocyanate to make the polyurea-type coating of the present invention. These ratios also control the ultimate nature of the polyurea produced including plastic flow, stress response and its ability to bond with other coated particles.

Most of the components for the coating are preferably added along with either the water or the isocyanate to facilitate proper mixing and metering of the components. A silane adhesion promoter is added to the heated sand or among the initial steps of the coating process. A colorant is added during the coating process by an injection line into the coating mixer. A last step includes adding a suspension of reinforcing particulates as the polymeric components are reacting and curing. A surfactant and/or flow aid can be added after the proppants have been coated to enhance wettability and enhanced flow properties with lower fines generation, respectively.

The method for the production of coated proppants according to the present invention can be implemented without the use of solvents. Accordingly, the mixture obtained in step (a) in one embodiment of the method is solvent-free, or is essentially solvent-free. The mixture is essentially solvent-free, if it contains less than 20 wt %, preferably less than 10 wt %, more preferably less than 5 wt %, and still more preferably less than 3 wt %, and most preferably less than 1 wt % of solvent, relative to the total mass of components of the mixture.

The coating is preferably performed at the same time as the curing of the coating on the proppant. In the present invention, the coated proppant becomes free-flowing at a time of less than 5 minutes, preferably within the range of 1-4 minutes, more preferably within the range of 1-3 minutes, and most preferably within the range of 1-2 minutes to form a coated, substantially cured, free-flowing, coated proppant. This short cycle time combines with the relatively moderate coating temperatures to form a coating/curing process that provides lower energy costs, smaller equipment, reduced emissions from the process and the associated scrubbing equipment, and overall increased production for the coating facility.

The coating material or combinations of different coating materials may be applied in more than one layer. For example, the coating process may be repeated as necessary (e.g. 1-5 times, 2-4 times or 2-3 times) to obtain the desired coating thickness. Any or all of these coatings may contain the reinforcing particulates of the present invention.

Alternatively, the reinforced coating of the present invention can be applied as the outermost layer over, e.g., a precured or curable phenolic coating, to take advantage of the underlying properties of the phenolic coating while adding the bonding ability of the polyurethane or polyurea-type coating. Such an outer coating would avoid the need for an added activator or surfactant compounds that are typically required for the phenolic coatings and thereby also avoid the potential for chemical incompatibility or interference with the formulated fracturing or breaker fluids used in hydraulic well fracturing. A typical size range for the final, coated proppant is desirably within the range of about 16 to about 100 mesh.

The reinforced coating of the present invention can also be applied to a previously coated proppant or formed as an outermost "skin" layer of a substantially continuous coating. This skin layer of reinforced coating reduces any residual surface tackiness or unreacted moieties remaining after the coating reactions and reduces deformation of the resulting proppant coating. This skin is formed by waiting until less than 20%, preferably less than 10% of the time remaining in the coating and curing process remains before adding water to the process. See our copending U.S. patent application Ser. No. 13/355,969 filed on 23 Jan. 2012 entitled "Manufacture of Polymer Coated Proppants", the disclosure of which is hereby incorporated by reference. The amount of added water, independent of any reinforcing particulates, should be small, i.e., less than 10 wt %, preferably less than 5 wt % of the total proppant mixture and just enough to maintain a free-flowing mixture without forming a slurry. In a polyurea-type coating, the small amount of water is believed to encourage remaining unreacted isocyanate moieties to react and form a polyurea-type skin coating on the surface of the underlying proppant.

Similarly, utilizing the high reactivity of a polyurea system, a polyurea can be formed as the basecoat, followed by a reinforced topcoat of a phenolic, or epoxy, polyurethane or other coating. As noted above, any or all of these can include functionalized reinforcing particulates or, with an adhesion promoter, non-functionalized particulates.

The amount of coating resin, that is, of the preferred polyurethane or polyurea-based components that are applied to a proppant, is preferably between about 0.5 and about 10 wt %, more preferably between about 1% and about 5 wt %, resin relative to the mass of the proppant as 100 wt %. With the method according to the present invention proppants can be coated at temperatures between about 50° C. and about 225° C., preferably within the range of about 75°-125° C. and preferably in a solvent-free manner. The coating process requires a comparatively little equipment and if necessary can also be carried out near the sand or ceramic substrate source, near the geographically location of the producing field or at/near the well itself.

The coated proppants can additionally be treated with surface-active agents, anticaking agents, or auxiliaries, such as talcum powder or stearate or other processing aids such as fine amorphous silica to improve pourability, wettability (even to the extent that a water wetting surfactant can be eliminated), dispersability, reduced static charge, dusting tendencies and storage properties of the coated product.

If desired and by no means is it required, the coated proppants can be baked or heated for a period of time sufficient to further enhance the ultimate performance of the coated particulates and further react the available isocyanate, hydroxyl and reactive amine groups that might remain in the coated proppant. Such a post-coating cure may occur even if additional contact time with a catalyst is used after a first coating layer or between layers. Typically, the post-coating cure step is performed like a baking step at a temperature within the range from about 100°-200° C. for a time of about 1 minute to 4 hours, preferably the temperature is about 125°-200° C. for about 1-30 minutes.

Even more preferably, the coated proppant is cured for a time and under conditions sufficient to produce a coated proppant that exhibits a loss of coating of less than 25 wt %, preferably less than 15 wt %, and even more preferably less than 5 wt % when tested according to simulated downhole conditions under ISO 13503-5:2006(E). Even more preferably, the coated proppant of the present invention exhibits the low dust and handling characteristics of a conventional pre-cured proppant (see API RP 60) but also exhibits a crush test result at 10,000 psi of less than 10%, more preferably less than 5%, and especially less than 2%. The coated proppants of the invention preferably also have an unconfined compressive strength of greater than 20 psi and more preferably more than 500 psi with a fracture conductivity at a given closure stress that is substantially equal to, or greater than, the conductivity of a phenolic coating used in the same product application range.

Using the Coated Proppants

The invention also includes the use of the coated proppants in conjunction with a fracturing liquid to increase the production of petroleum or natural gas. Techniques for fracturing an unconsolidated formation that include injection of consolidating fluids are also well known in the art. See U.S. Pat. No. 6,732,800 the disclosure of which is herein incorporated by reference. Generally speaking, a fluid is injected through the wellbore into the formation at a pressure less than the fracturing pressure of the formation. The volume of consolidating fluid to be injected into the formation is a function of the formation pore volume to be treated and the ability of the consolidating fluid to penetrate the formation and can be readily determined by one of ordinary skill in the art. As a guideline, the formation volume to be treated relates to the height of the desired treated zone and the desired depth of penetration, and the depth of penetration is preferably at least about 30 cm radially into the formation. Please note that since the consolidation fluid is injected through the perforations, the treated zone actually stems from the aligned perforations.

Techniques for hydraulically fracturing a subterranean formation will be known to persons of ordinary skill in the art, and will involve pumping the fracturing fluid into the borehole and out into the surrounding formation. The fluid pressure is above the minimum in situ rock stress, thus creating or extending fractures in the formation. In order to maintain the fractures formed in the formation after the release of the fluid pressure, the fracturing fluid carries a proppant whose purpose is to prevent the fracturing from closing after pumping has been completed.

The fracturing liquid is not particularly restricted and can be selected from among the fracturing liquids known in the specific field. Suitable fracturing liquids are described, for example, in W C Lyons, G J Plisga, "Standard Handbook Of Petroleum And Natural Gas Engineering," Gulf Professional Publishing (2005). The fracturing liquid can be, for example, liquefied petroleum gas (LPG), water gelled with polymers, an oil-in-water emulsion gelled with polymers, or a water-in-oil emulsion gelled with polymers. In one preferred embodiment, the fracturing liquid comprises the following constituents in the indicated proportions: 1000 l water, 20 kg potassium chloride, 0.120 kg sodium acetate, 3.6 kg guar gum (water-soluble polymer), sodium hydroxide (as needed) to adjust a pH-value from 9 to 11, 0.120 kg sodium thiosulfate, 0.180 kg ammonium persulfate and optionally a crosslinker such as sodium borate or a combination of sodium borate and boric acid to enhance viscosity.

In addition, the invention relates to a method for the production of petroleum or natural gas which comprises the injection of the coated proppant into the fractured stratum with the fracturing liquid, i.e., the injection of a fracturing liquid which contains the coated proppant, into a petroleum- or natural gas-bearing rock layer, and/or its introduction into a fracture in the rock layer bearing petroleum or natural gas. The method is not particularly restricted and can be implemented in the manner known in the specific field. The concentration of proppant in the fracturing fluid can be any concentration known in the art, and will typically be in the range of about 0.5 to about 20 pounds of proppant added per gallon of clean fluid.

The fracturing fluid can contain an added proppant-retention agent, e.g. a fibrous material, a curable resin coated on the proppant, platelets, deformable particulates, or a sticky proppant coating to trap proppant particulates in the fracture and prevent their production through the wellbore. Fibers, in concentration that preferably ranges from about 0.1% to about 5.0% by weight of proppant, for example selected from natural organic fibers, synthetic organic fibers, glass fibers, carbon fibers, ceramic fibers, inorganic fibers, metal fibers and mixtures thereof, in combination with curable resin-coated proppants are particularly preferred. The proppant-retention agent is intended to keep proppant solids in the fracture, and the proppant and proppant-retention agent keep formation particulates from being produced back out from the well in a process known as "flowback."

EXAMPLE

Example 1

Polyurea-Type Coatings with Reinforcing Functionalized Silica

Table 1 shows a sequence of actions, times of addition and ingredients for making a reinforced, urea-type proppant coating that takes advantage of water used for urea formation to incorporate a dispersion of functionalized silica into the coating in a substantially even distribution throughout the polymeric coating.

TABLE 1

LAB CYCLE (Functionalized Silica Dispersion):

| TIME(Start/Stop) (Min:Sec) | STEP |
| --- | --- |
| 0:00 | 2000 g of preheated sand (208° F.) is added to a lab mixer |
| 0:00/0:05 | 2 g of a silane possessing a reactive primary amino group and hydrolyzable ethoxysilyl groups is added with mixing over a 5 sec period as an adhesion promoter between the sand and the polymeric coating |
| 0:15/2:00 | 36.5 g of poly-MDI is added over a 105 second period to coat the sand core solids |
| 0:20/0:25 | 2 g of an oil based colorant is optionally added over a 5 second period |
| 0:30/2:00 | 31.8 g of an aqueous mix of 10.8 g chemically functionalized silica (37-40 wt % solids), 20 g water, and 1.0 g of a tertiary amine blowing catalyst are added over this 90 sec period to react with the poly-MDI coated core sand solids and form a polymeric coating with a substantially uniform dispersion of chemically bonded silica particulates |
| 2:30 | Coated sand is discharged at 175° F. |

Example 2

Polyurea-Type Coatings with Reinforcing Non-Functionalized Silica

Table 2 shows a sequence of actions, times of addition and ingredients for making a reinforced urea-type proppant coating that takes advantage of water used for urea formation to incorporate a dispersion of non-functionalized silica into the coating.

TABLE 2

LAB CYCLE (Non-Functionalized Silica Dispersion):

| TIME(Start/Stop) (Min:Sec) | STEP |
| --- | --- |
| 0:00 | 2000 g of preheated sand (207° F.) is added to a lab mixer |
| 0:00/0:05 | 2 g of a silane possessing a reactive primary amino group and hydrolyzable ethoxysilyl groups is added with mixing over a 5 sec period |
| 0:15/1:45 | 36.5 g of poly-MDI is added over a 90 second period |
| 0:20/0:25 | 2 g of an oil based colorant is added over a 5 second period |
| 0:30/1:45 | 31.8 g of an aqueous mix of 10.8 g non-functionalized silica (colloidal dispersion in water of amorphous silica 100 nm spheres at 50 wt % concentration), 20 g water, and 1.0 g of a tertiary amine blowing catalyst are added over this 90 sec period |
| 2:30 | Coated sand is discharged at 176° F. |

Without wishing to be bound by a particular theory of operation or function, the use of the present invention enables chemical integration of reinforcing particulates into the proppant coating to form a reinforced, hybrid coating. This hybrid should be harder and outperform what might be expected by adding only a silica "filler" into the proppant coating that is merely dispersed in the coating but is not otherwise grafted into the polymer or chemically bound to it. This suggests that ability to adjust and control the amount of proppant deformation and conductivity characteristics that are exhibited by the proppant to more closely tailor the proppant to the demands of the fractured field with only minor adjustments to the coating process and formulation.

The advantages of using a waterborne dispersion of reinforcing particulates include: (a) the tolerance of urea-type and polyurethane polymers for the water used in the dispersion, and (b) the benefit of dealing with discrete very small, nanometer-size particulates to provide high surface area for chemical interactions with the developed and reacting polymers of the coating.

Some possible reasons for how and/or why the invention works as well as it does might include:

1) The isocyanate and —NCO groups are hydrolyzed by the appropriate selection of an active catalyst (usually tertiary amines) in combination with water;
2) The amount of water used is determined by considering the efficiency of the water/catalyst mix while also avoiding excessive cooling by water loss;
3) The reaction temperature is high enough to drive the reaction but low enough to control removal of added water;
4) The isocyanate and water catalyst are fed simultaneously onto the heated sands to create amines throughout the coating;
5) The generated amines react very fast with neighboring —NCO groups to produce the urea and/or biuret-type linkages; and
6) Because the urea reaction accommodates the presence of water, it is equally tolerant of a water dispersion containing other additives, such as functionalized reinforcing particulates, especially silica, while the blowing catalyst promotes the reaction of —NCO groups with hydroxyl functionalities from the surface of hydrated or adhesively promoted silica or chemically modified silica.

Once those skilled in the art are taught the invention, many variations and modifications are possible without departing from the inventive concepts disclosed herein. The invention, therefore, is not to be restricted except in the spirit of the appended claims.

What is claimed:

1. A coated proppant comprising:
   (a) a core solid and
   (b) a cured or substantially cured polymeric coating disposed on the core solid comprising a silane adhered to the core solid and a mixture of a polyurea-type polymer and a functionalized silica substantially dispersed throughout the cured or substantially cured polymeric coating, wherein said polyurea-type polymer is formed from an isocyanate component with at least two reactive isocyanate groups.

2. A coated proppant according to claim 1 wherein said core solid is sand.

3. A coated proppant according to claim 1 wherein said polyurea-type polymer is formed from a diisocyanate.

4. A coated proppant according to claim 1 wherein said isocyanate component is a mixture of a diisocyanate and a triisocyanate.

5. A coated proppant according to claim 1 wherein said functionalized silica comprises a functional group that is a hydroxyl, amino, carboxy, thiol, epoxy, amide, or isocyano group.

6. A coated proppant according to claim 5 wherein said functional group is an amino group.

7. A coated proppant according to claim 5 wherein said functional group is an epoxy group.

8. A coated proppant according to claim 1 wherein said silane comprises an organic functionality selected from the group consisting of methyl, epoxide, epoxy/melamine, amino, mercapto, chloropropyl, methacryl, methacryloxy, vinyl, benzylamino, ureido, tetrasulfido, hydroxyl or hydroxyalkyl, and $C_1$-$C_4$ alkoxy groups.

9. A coated proppant according to claim 1 wherein said silane comprises a reactive primary amino group and hydrolyzable ethoxysilyl groups.

10. A coated proppant according to claim 1 wherein said coating further comprises fullerenes, activated carbon, rubber, or rubber-reinforced polymers.

11. A coated proppant according to claim 1 wherein said coating further comprises glass fibers, ceramic fibers, carbon fibers, aramid fibers, or silicon carbide whiskers.

12. A coated proppant according to claim 1 wherein the silane is present in an amount of about 0.1 wt % relative to the mass of the solid core.

13. A coated proppant according to claim 1 wherein said coating is present in amount of about 1% to about 5 wt % relative to the mass of the solid core.

14. A method for making a coated proppant with a cured or substantially cured polymeric polyurea-type coating, said method comprising:
   mixing preheated sand with a silane to produce a silane coated sand;
   mixing the silane coated sand with an isocyanate and an aqueous mixture of a functionalized silica in the presence of a tertiary amine catalyst under conditions sufficient to produce the coated proppant with the cured or substantially cured polymeric polyurea-type coating.

15. A method according to claim 14 wherein said silane comprises a reactive primary amino group and hydrolyzable ethoxysilyl groups.

16. A method according to claim 14 wherein said functionalized silica comprises a functional group that is a hydroxyl, amino, carboxy, thiol, epoxy or amide group.

17. A method according to claim 14 wherein said silane comprises an organic functionality selected from the group consisting of methyl, hydroxyl, hydroxyalkyl, epoxide, epoxy/melamine, amino, mercapto, chloropropyl, methacryl, methacryloxy, vinyl, benzylamino, ureido, tetrasulfido, and $C_1$-$C_4$ alkoxy groups.

18. A method according to claim 14, wherein the silane is present in an amount of about 0.1 wt % relative to the mass of the sand.

19. A method according to claim 14, wherein the coating that is formed is present in amount of about 1% to about 5 wt % relative to the mass of the sand.

20. A method according to claim 14, wherein the isocyanate is a diisocyanate.

21. A method according to claim 20, wherein the diisocyanate is methylenediphenyl diisocyanate.

* * * * *